United States Patent
Al-Meqbel et al.

(10) Patent No.: US 11,035,179 B2
(45) Date of Patent: Jun. 15, 2021

(54) DISCONNECTING A STUCK DRILL PIPE

(71) Applicant: Saudi Arabian Oil Company, Dhahran (SA)

(72) Inventors: Ali Nasser Al-Meqbel, Riyadh (SA); Abdulrahman M. Al-Musare, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/674,863

(22) Filed: Nov. 5, 2019

(65) Prior Publication Data

US 2021/0131194 A1 May 6, 2021

(51) Int. Cl.
| | |
|---|---|
| *E21B 17/042* | (2006.01) |
| *F16L 15/06* | (2006.01) |
| *F04D 29/08* | (2006.01) |
| *F04D 13/10* | (2006.01) |

(52) U.S. Cl.
CPC ............ *E21B 17/042* (2013.01); *F04D 13/10* (2013.01); *F04D 29/086* (2013.01); *F16L 15/06* (2013.01)

(58) Field of Classification Search
CPC ...... E21B 17/042; F04D 29/086; F04D 13/10; F16L 15/06
USPC ......................................... 277/619, 611, 638
See application file for complete search history.

(56) References Cited

U.S. PATENT DOCUMENTS

| | | |
|---|---|---|
| 3,083,767 A | 4/1963 | Brown |
| 3,509,971 A | 5/1970 | Gerstine et al. |
| 3,606,218 A | 9/1971 | Enlund et al. |
| 5,170,433 A | 12/1992 | Elliott et al. |
| 5,203,178 A | 4/1993 | Shyu |
| 5,323,853 A | 6/1994 | Leismer et al. |
| 5,418,858 A | 5/1995 | Shoureshi |
| 5,718,291 A | 2/1998 | Lorgen et al. |
| 5,984,029 A | 11/1999 | Griffin et al. |
| 6,269,883 B1 | 8/2001 | Gissler et al. |
| 6,894,449 B2 | 5/2005 | Nishi |

(Continued)

FOREIGN PATENT DOCUMENTS

| | | |
|---|---|---|
| CA | 22202771 | 5/1996 |
| CN | 105546355 | 5/2016 |

(Continued)

OTHER PUBLICATIONS

PCT International Search Report and Written Opinion in International Appln. No. PCT/US2020/059044, dated Jan. 28, 2021, 13 pages.

*Primary Examiner* — Tara Schimpf
*Assistant Examiner* — Manuel C Portocarrero
(74) *Attorney, Agent, or Firm* — Fish & Richardson P.C.

(57) ABSTRACT

A drill pipe assembly includes a first drill pipe, a second drill pipe, and a tubular pipe link residing between and fluidically coupled to the first drill pipe and the second drill pipe. The tubular pipe link includes a first end and a second end opposite the first end. The first end is threadedly coupled to a threaded end of the first drill pipe to form a threaded connection. The second end is attached to the second drill pipe. The first end of the pipe link has less threads than the threaded end of the first drill pipe. At least some of the threads of the first end of the pipe link are collapsible to disconnect the first drill pipe from the second drill pipe responsive to torque to tighten the first drill pipe to the pipe link.

20 Claims, 4 Drawing Sheets

(56) References Cited

U.S. PATENT DOCUMENTS

| | | |
|---|---|---|
| 7,292,227 B2 | 11/2007 | Fukumoto et al. |
| 8,366,421 B2 | 2/2013 | Munakata et al. |
| 8,479,827 B2 | 7/2013 | Davis |
| 9,074,963 B2 | 7/2015 | Rose |
| 2003/0156918 A1* | 8/2003 | Benedict ............... E21B 17/042 |
| | | 411/81 |
| 2011/0088903 A1 | 4/2011 | Onadeko et al. |

FOREIGN PATENT DOCUMENTS

| | | |
|---|---|---|
| CN | 205480216 | 8/2016 |
| EP | 545264 | 9/1993 |
| EP | 574574 | 6/1997 |
| GB | 2157743 | 10/1985 |
| JP | 2882170 | 4/1999 |
| RU | 2572617 | 1/2016 |
| WO | WO 0192679 | 12/2001 |
| WO | 2003048501 | 6/2003 |
| WO | 2014185912 | 11/2014 |

\* cited by examiner

DISCONNECTING A STUCK DRILL PIPE

FIELD OF THE DISCLOSURE

This disclosure relates to wellbore operations, in particular, wellbore drilling operations.

BACKGROUND OF THE DISCLOSURE

During drilling operations, a drill pipe can get stuck in the wellbore, for example, due to pressure differentials at a downhole location of the wellbore or due to mechanical issues. A drill pipe is considered stuck if the pipe cannot be retrieved or freed from the wellbore without damaging the pipe. Pipe sticking can damage the pipe, the wellbore, and the hydrocarbon reservoir.

SUMMARY

Implementations of the present disclosure include a drill pipe assembly that includes a first drill pipe configured to be disposed in a wellbore. The first drill pipe includes a threaded end. The drill pipe assembly also includes a second drill pipe configured to be disposed in the wellbore downhole of the first drill pipe. The drill pipe assembly also includes a tubular pipe link that resides between and is fluidically coupled to the first drill pipe and the second drill pipe. The pipe link includes a first end and a second end opposite the first end. The first end is threadedly coupled to the threaded end of the first drill pipe to form a threaded connection. The second end is attached to the second drill pipe. The first end of the pipe link has less threads than the threaded end of the first drill pipe. At least some of the threads of the first end of the pipe link are collapsible to disconnect the first drill pipe from the second drill pipe responsive to torque to tighten the first drill pipe to the pipe link.

In some implementations, the threaded end of the first drill pipe has external threads and the first end of the pipe link has internal threads. In some implementations, the threaded end of the first drill pipe is tapered toward the pipe link and the internal threads of the pipe link are tapered in a corresponding direction to be threadedly attached to the first drill pipe.

In some implementations, the first drill pipe is fluidically coupled, through the tubular pipe link, to the second drill pipe to flow fluid generally uninterruptedly between the first drill pipe and the second drill pipe.

In some implementations, the second end of the pipe link is threadedly coupled to a coupling end of the second drill pipe. Any of the second end and the coupling end of the second drill pipe has more threads than the first end of the pipe link. In some implementations, the second end of the pipe link has external threads and the coupling end of the second drill pipe has internal threads to be threadedly attached the pipe link.

In some implementations, the tubular pipe link is part of a drill string and the threaded connection between the pipe link and the first drill pipe is the weakest point of the drill string.

In some implementations, the threads of the first end of the pipe link are configured to collapse under torque that is about 15% less than a required torque to break a next weakest link or portion of the drill string.

In some implementations, the first end of the pipe link includes between 12% and 18% less threads than the threaded end of the first drill pipe. In some implementations, the first end of the pipe link including about 15% less threads than the threaded end of the first drill pipe.

In some implementations, the first end of the pipe link has 12 threads and the threaded end of the first drill pipe has 14 threads.

Implementations of the present disclosure also include a wellbore tool assembly that includes a drill pipe configured to be disposed in a wellbore, a bottom hole assembly (BHA) coupled to the drill pipe, and a tubular pipe link fluidically coupled to the drill pipe. The tubular pipe link resides between a first portion of the drill pipe and a second portion of the drill pipe to fluidically couple the first portion of the drill pipe to the second portion of the drill pipe. The tubular pipe link includes a first end and a second end opposite the first end. The first end is threadedly coupled to a threaded end of the first portion of the drill pipe to form a threaded connection and the second end is attached to the second portion of the drill pipe. The first end of the pipe link has less threads than the threaded end of the first portion of the drill pipe. At least some of the threads of the first end of the pipe link are collapsible to disconnect the first portion of the drill pipe from the second portion of the drill pipe responsive to torque to tighten the first portion of the drill pipe to the pipe link.

In some implementations, the BHA resides downhole of the drill pipe with the tubular pipe link residing uphole of the BHA.

In some implementations, the BHA is disposed uphole of the tubular pipe link and resides between a third portion of the drill pipe and the second portion of the drill pipe, where the tubular pipe link resides between the second portion of the drill pipe and the first portion of the drill pipe.

In some implementations, the wellbore tool assembly also includes a second tubular pipe link similar to the tubular pipe link. The second tubular pipe link is fluidically coupled to the drill pipe. The tubular pipe link resides uphole of the BHA and the second tubular pipe link resides downhole of the BHA.

In some implementations, the threaded end of the first drill pipe has external threads and the first end of the pipe link has internal threads.

In some implementations, the first end of the pipe link has between 12% and 18% less threads than the threaded end of the first drill pipe.

Implementations of the present disclosure also include a drill pipe disconnect link that has a tubular body configured to be disposed in a wellbore. The tubular body defines a first end and a second end opposite the first end. The first end is configured to be threadedly coupled to a threaded end of a first drill pipe and the second end is configured to be attached to a second drill pipe to fluidically couple the first drill pipe to the second drill pipe. The first end has less threads than the threaded end of the first drill pipe. At least some of the threads of the first end are collapsible to disconnect the first drill pipe from the second drill pipe responsive to torque to tighten the first drill pipe to the tubular body when the second drill pipe is disposed downhole of the first drill pipe and is stuck in the wellbore.

In some implementations, the threaded end of the first drill pipe has external threads and the first end of the tubular body has internal threads.

In some implementations the drill pipe disconnect link is part of a drill string and a threaded connection between the pipe link and the first drill pipe is the weakest point of the drill string.

DETAILED DESCRIPTION OF THE DISCLOSURE

The present disclosure describes a pipe link or drilling disconnect tool that allows a portion of a stuck drill string to be released and retrieved from a wellbore. By applying torque (for example, applying torque from or near a surface of the wellbore) to the portion of the drill string that is uphole of the pipe link, the threads of the pipe link break or collapse to disconnect the portion of the drill string from the pipe link. The pipe link has less or fewer threads than the portion of the drill string such that applying torque to tighten the portion of the drill pipe to the pipe link causes the threads of the pipe link to break.

Particular implementations of the subject matter described in this specification can be implemented so as to realize one or more of the following advantages. For example, a portion of a stuck drill string can be quickly retrieved from a wellbore without using expensive tools (for example, cutting tools), saving time and resources as well as decreasing shutdown time. Oil and gas drilling is one of the most (if not the most) complex and costly operations in the energy sector. Freeing a stuck drill pipe quickly in an emergency scenario can significantly save resources and prevent damage in the formations and in the reservoir. The tubular pipe link disclosed in the present disclosure can be used in off-shore and onshore applications, and in conventional and unconventional drilling. The tubular pipe link disclosed in the present disclosure can be implemented in existing drill pipes or utilized with new drill pipes.

Figure 1:
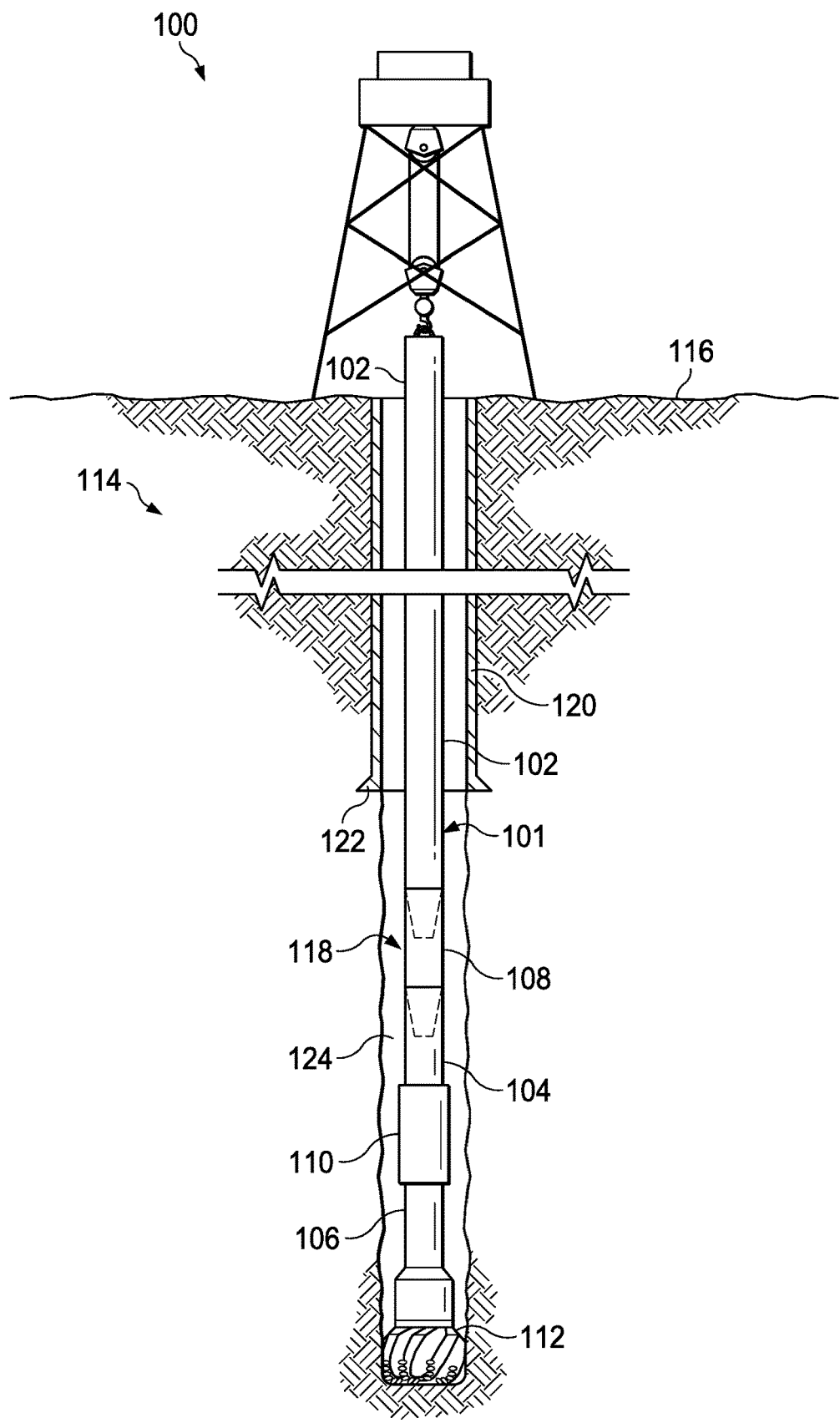
FIG. 1 is a front schematic view of a wellbore tool assembly disposed in a wellbore.

FIG. 1 shows a wellbore tool assembly 100 that includes a drill pipe assembly 118 and a bottom hole assembly 110 (BHA). The drill pipe assembly 118 and the BHA 110 can be part of a drill string 101 used to drill a wellbore 114. The drill pipe assembly 118 is disposed in the wellbore 114 and includes a first drill pipe 102, a second drill pipe 104, and a tubular pipe link 108. The wellbore can includes a cased portion and an open-hole portion. In some implementations, the wellbore can be uncased, including only an open-hole portion. The cased portion includes a casing 120 with an end 122 (for example, at the casing depth) at a downhole location of the wellbore 114. The wellbore includes an open hole 124 downhole of the casing end 122 where part or all of the wellbore tool assembly 100 is disposed. The drill string 101 includes a drill bit 112 that can be part of the BHA 110 or be disposed downhole of the BHA 110.

The tubular pipe link 108 resides between the first drill pipe 102 and the second drill pipe 104. As further described in detail later with respect to FIG. 6, the first drill pipe 102 and the second drill pipe 104 can be the same drill pipe (for example, they can have the same diameter and mechanical characteristics) and the tubular pipe link 108 can reside between two portions of the same pipe. Under a stuck pipe condition, the tubular pipe link 108 can be decoupled from the first drill pipe 102 to retrieve the first drill pipe 102 and the components of the drill string 101 uphole of the tubular pipe link 108.

The tubular pipe link 108 is fluidically coupled to the first drill pipe 102 and to the second drill pipe 104 to fluidically connect the two drill pipes 102 and 104. As further described in detail later with respect to FIGS. 4 and 5, the tubular pipe link 108 is threadedly connected to the first drill pipe 102, forming a connection that, under a pipe stuck condition, is breakable under torque applied to the first drill pipe 102.

Figure 2:
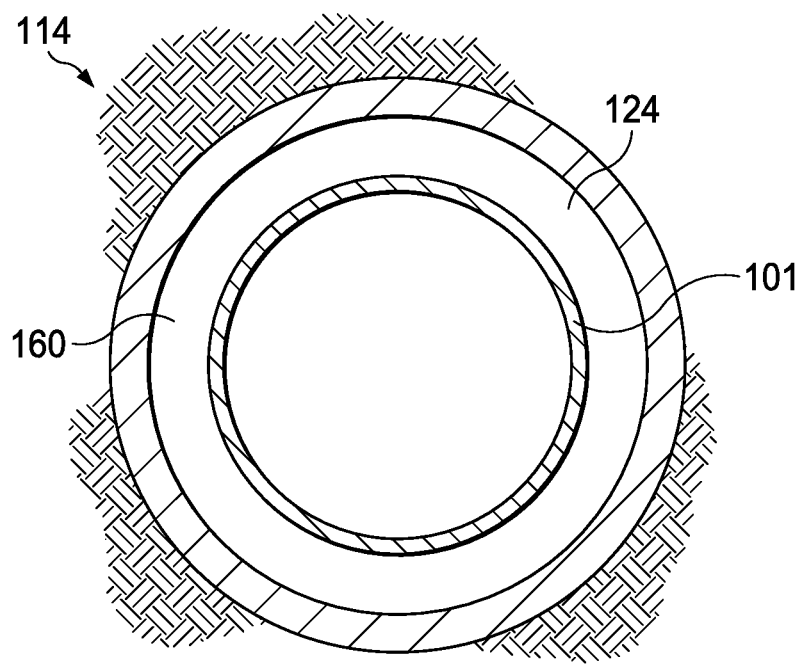
FIG. 2 is a top schematic view, cross-sectional, of a drill string in a wellbore under normal conditions.
Figure 3:
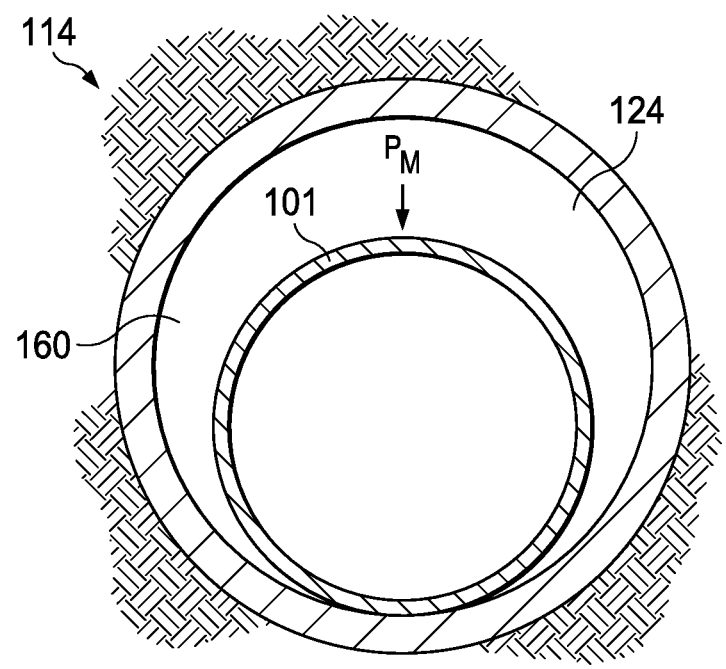
FIG. 3 is a top schematic view, cross-sectional, of the drill string in the wellbore of FIG. 2, under a pipe stuck condition.

FIGS. 2 and 3 show a top, cross-sectional view of a normal wellbore condition and a stuck pipe condition, respectively. Referring to FIG. 2, the drill string 101 is disposed in the wellbore 114 (for example, in the open hole 124 portion of the wellbore) and forms a generally uniform or constant annulus 160 with the wellbore 114. Under normal conditions, the drill string 101 is able to move generally freely along the wellbore 114. As shown in FIG. 3, under certain conditions, the drill string 101 can get stuck in the wellbore 114. For example, the sticking can be caused by differential sticking, mechanical sticking, or other type of sticking. Mechanical sticking may be caused by borehole instabilities, such as caving, sloughing, or collapse. FIG. 3 shows an example of a differential sticking condition. In differential sticking, the pressure '$P_M$' in the annulus 160 exceeds the pressure of the formation, causing the drill string 101 (for example, a portion of the drill string such as the pipe downhole of the tubular pipe link 108) to move against the wall of the wellbore 114, embedding the drill string 101 in the wall or a filter cake of the wellbore 114. The internal filter cake pressure decreases to a point in which the drill string 101 contacts the filter cake, causing the pipe to be held against the wall of the wellbore 114 by differential pressure. In high-angle and horizontal wellbores, gravitational force contributes to extended contact between the drill string 101 and the formation or the wall of the wellbore 114.

Figure 4A:
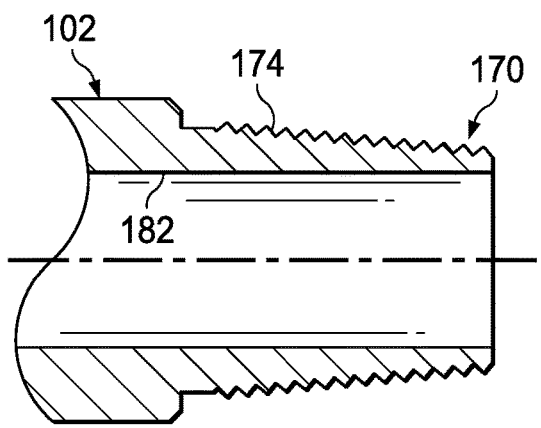
FIG. 4A is a side cross-sectional view of a portion of a first drill pipe.
Figure 4B:
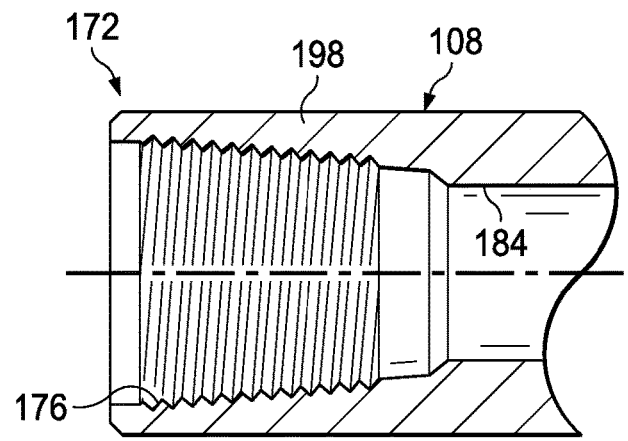
FIG. 4B is a side cross-sectional view of a first portion of a tubular pipe link.
Figure 5A:
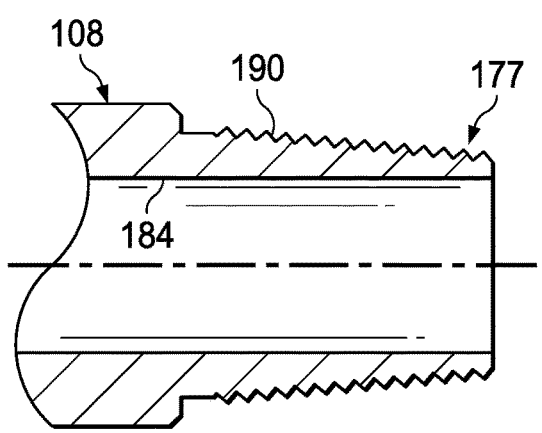
FIG. 5A is a side cross-sectional view of a second portion of the tubular pipe link in FIG. 4B.
Figure 5B:
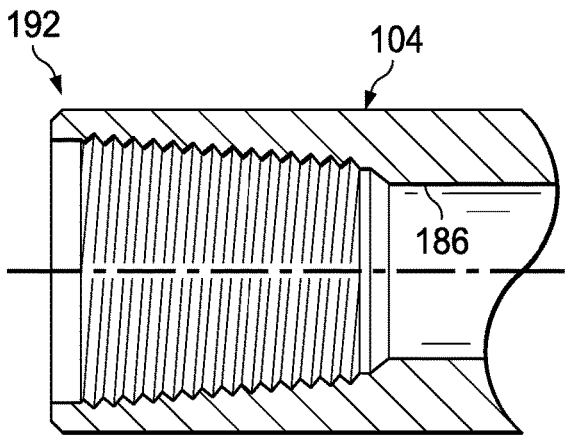
FIG. 5B is a side cross-sectional view of a portion of a second drill pipe.

FIGS. 4A and 4B show a portion of the first drill pipe 102 and a first portion of the tubular pipe link 108, respectively. FIGS. 5A and 5B show a second portion of the tubular pipe link 108 and a portion of the second drill pipe 104, respectively. The tubular pipe link 108 has a first end 172 and a second end 177 opposite the first end 172. As shown in FIGS. 4A and 4B, the first end 172 of the tubular pipe link 108 threadedly connects to a threaded end 170 of the first drill pipe 102 to form a threaded connection. The first end 172 of the tubular pipe link 108 has internal threads 176 and the threaded end 170 of the first drill pipe 102 has external threads 174.

The threaded connection between the tubular pipe link 108 and the first drill pipe 102 is the weakest point (or the point breakable under the lowest torque) of the drill string 101. The first end 172 of the tubular pipe link 108 has less threads 176 than the threaded end 170 of the first drill pipe 102. At least some of the threads 176 of the first end 172 of the tubular pipe link 108 are collapsible to disconnect the first drill pipe 102 from the tubular pipe link 108 (and by extension, from the second drill pipe 104 connected to the tubular pipe link 108) responsive to torque to tighten the first drill pipe 102 to the tubular pipe link 108. For example, the first end 172 of the tubular pipe link 108 can have between 12% and 18% less threads than the threaded end 170 of the first drill pipe 102. Specifically, the first end 172 of the tubular pipe link 108 has about 15% less threads than the threaded end 170 of the first drill pipe 102. For example, the first end 172 of the tubular pipe link 108 can have 12 threads and the threaded end 170 of the first drill pipe 102 can have 14 threads 174. The difference in threads may be generally equivalent to the difference in torque needed to break the threaded connection. For example, with the first end 172 having about 15% less threads than the threaded end 170, the threads 176 of the first end 172 can collapse under torque that is about 15% less than a torque required to break a connection where the first end 172 has the same amount of threads as the threaded end 170 of the first drill pipe 102. In some implementations, the threads 176 of the first end 172 can collapse under torque that is about 15% less than a required torque to break a next weakest link or portion of the drill string 101. By the treads 176 being collapsible it is meant that at least some of the threads 176 plastically deform, under a certain torsional torque, to release the threaded end 170 of the first drill pipe 102 from the threads 176 of the tubular pipe link 108. By 'collapsible' it is meant that the threads 176 break due to external force applied to the first drill pipe 102, undoing the connection between the first drill pipe 102 and the tubular pipe link 108.

The threaded end 170 of the first drill pipe 102 can be tapered toward the pipe link 108 and the internal threads 176 of the pipe link 108 can be tapered in a corresponding opposite direction to be threadedly attached to the first drill pipe 102, with the outer diameters of the first drill pipe 102 and the tubular pipe link 108 being generally the same. Similarly, the first drill pipe 102 has an internal surface 182 that defines an internal diameter that is generally equal to an internal diameter of the tubular pipe link 108 defined by an inner surface 184 of the tubular pipe link 108. Thus, with the threaded connection formed between the first drill pipe 102 and the tubular pipe link 108, fluid can flow across the threaded connection generally uninterruptedly. The tubular pipe link 108 can have a length of about 5 feet.

Referring to FIG. 5, a second end 177 of the tubular pipe link 108 is threadedly attached to a coupling end 192 of the second drill pipe 104. The second end 177 of the tubular pipe link 108 can have external threads (similar to the threaded end 170 of the first drill pipe 102), and the coupling end 192 of the second drill pipe 104 can have internal threads. Similar to the connection between the tubular pipe link 108 and the first drill pipe 102, the second end 177 of the tubular pipe link 108 and the coupling end 192 of the second drill pipe 104 can have tapered threads 190. An inner surface 186 of the second drill pipe 104 defines an internal diameter equal to the internal diameter of the tubular pipe link 108. Thus, the first drill pipe 102 is fluidically coupled, through the tubular pipe link 108, to the second drill pipe 104 to flow fluid generally uninterruptedly between the first drill pipe 102 and the second drill pipe 104. The second end 177 of the tubular pipe link 108 and the coupling end 192 of the second drill pipe 104 have more threads than the first end 172 of the tubular pipe link 108. The second end 177 can have the same amount of threads as the coupling end 192. For example the second end 177 can have 14 threads and the coupling end 192 can have 14 threads. In some implementations, the second end 177 can be attached to the coupling end 192 by other means, for example, using flange fittings or by welding the two ends together.

Figure 6:
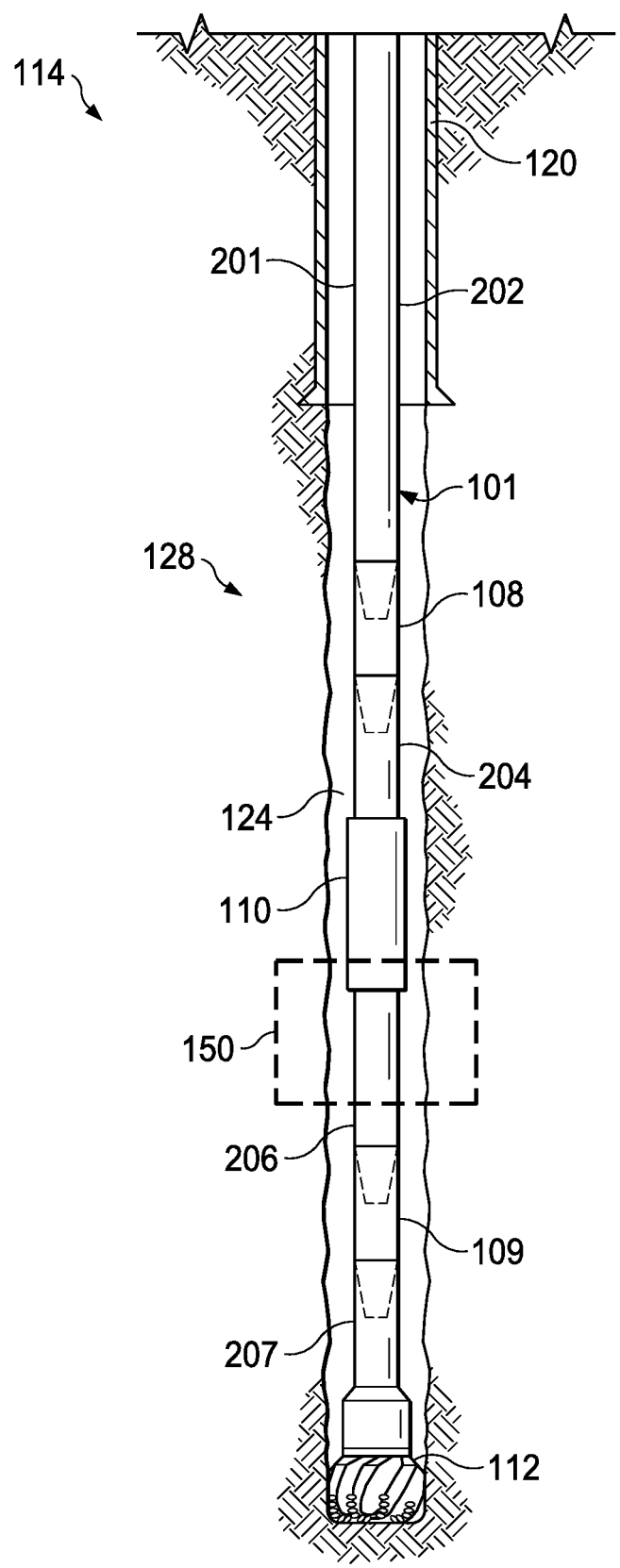
FIG. 6 is a front schematic view of a wellbore tool assembly according to an implementation.

FIG. 6 shows an implementation of a wellbore tool assembly 128 that includes a drill pipe 201 of a drill string 101 disposed in the wellbore 114. The wellbore tool assembly 128 also includes a bottom hole assembly (BHA) 110 coupled to the drill pipe 201, and two tubular pipe links 108 and 109 fluidically coupled to the drill pipe 201. The BHA can include drill collars and subs such as stabilizers, reamers, shocks, and hole-openers. In some implementations, the BHA can also include the drill bit 112. The drill pipe 201 can include multiple portions (for example, the drill pipe can be made of multiple pipes) such as a first portion 207, a second portion 206, a third portion 204, and a fourth portion 202. The first tubular pipe link 108 resides between the third portion 204 of the drill pipe 201 and the fourth portion 202 of the drill pipe 201 to fluidically couple the third portion 204 to the fourth portion 202 (for example, similar to the first drill pipe and second drill pipe in FIG. 1). The first tubular pipe link 108 and the second tubular pipe link 109 are similar to the tubular pipe link of FIGS. 1-5. In some implementations, the wellbore tool assembly 128 can have only one tubular pipe link disposed downhole of the BHA 110. In such implementations, the BHA 110 resides between the third portion 204 of the drill pipe and the second portion 206 of the drill pipe, with the tubular pipe link 109 residing between the second portion 206 of the drill pipe and the first portion 207 of the drill pipe.

The wellbore tool assembly 128 can be configured to satisfy certain wellbore or engineering requirements depending on a location 150 of a potential risk of sticking in the wellbore 114. Specifically, the tubular pipe link 108 can be disposed above the BHA 110 in an exploration well to prevent damaging the hydrocarbon reservoir, and the tubular pipe link 108 can be disposed under (and in some implementations, under and above) the BHA 110 in a known field (for example, in a wellbore where the statistics or parameters can be identified from offset wells). The tubular pipe link 108 is preferably disposed at a location different than the location 150 of potential risk. For example, in drilling a 10,000 ft wellbore in an unknown formation with a potential of having a pipe stuck condition at a depth of between 8,000 ft and 8,500 ft, the wellbore tool assembly 128 can have two tubular pipe links 108 and 109. One tubular pipe link 108 is disposed uphole of the BHA 110 at around 6,000 ft and the other tubular pipe link 109 is disposed downhole of the BHA 110 at around 9,000 ft. Thus, the wellbore tool assembly 128 allows the pipe to be released from under or above the sticking zone. The second tubular pipe link 109 is located in or below the potential stuck zone 150 such that in a stuck condition, the drill pipe has a change of disconnecting from the second tubular pipe link 109 to save the BHA 110, but if the drill pipe fails to disconnect from the second tubular pipe link 109, the drill pipe will still be freed from the first tubular pipe link 108.

The present disclosure includes a method that includes deploying a drill string (see FIG. 1) to a downhole location of a wellbore, the drill string including a first drill pipe, a second drill pipe disposed downhole of the first drill pipe, and a tubular pipe link residing between and fluidically coupled to the first drill pipe and the second drill pipe. The tubular pipe link includes a first end and a second end opposite the first end. The first end is threadedly coupled to a threaded end of the first drill pipe to form a threaded connection and the second end is attached to the second drill pipe. The first end of the tubular pipe link has less threads than the threaded end of the first drill pipe to collapsible to disconnect the first drill pipe from the second drill pipe responsive to torque to tighten the first drill pipe to the tubular pipe link. The method also includes applying torque (for example, torque to tighten the first drill pipe to the tubular pipe link) to the first drill pipe to collapse at least some of the threads of the first end of the tubular pipe link to disconnect the first drill pipe from the second drill pipe.

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A drill pipe assembly comprising:
   a first drill pipe configured to be disposed in a wellbore, the first drill pipe comprising a threaded end;
   a second drill pipe configured to be disposed in the wellbore downhole of the first drill pipe; and
   a tubular pipe link residing between and fluidically coupled to the first drill pipe and the second drill pipe, the tubular pipe link comprising a first end and a second end opposite the first end, the first end threadedly coupled to the threaded end of the first drill pipe to form a threaded connection and the second end attached to the second drill pipe, the first end of the tubular pipe link comprising less threads than the threaded end of the first drill pipe, wherein at least some of the threads of the first end of the tubular pipe link are collapsible to disconnect the first drill pipe from the second drill pipe responsive to torque to tighten the first drill pipe to the tubular pipe link.

2. The drill pipe assembly of claim 1, wherein the threaded end of the first drill pipe comprises external threads and the first end of the tubular pipe link comprises internal threads.

3. The drill pipe assembly of claim 2, wherein the threaded end of the first drill pipe is tapered toward the tubular pipe link and the internal threads of the tubular pipe link are tapered in a corresponding direction to be threadedly attached to the first drill pipe.

4. The drill pipe assembly of claim 1, wherein the first drill pipe is fluidically coupled, through the tubular pipe link, to the second drill pipe to flow fluid substantially uninterruptedly between the first drill pipe and the second drill pipe.

5. The drill pipe assembly of claim 1, wherein the second end of the tubular pipe link is threadedly coupled to a coupling end of the second drill pipe, any of the second end and the coupling end of the second drill pipe comprising more threads than the first end of the tubular pipe link.

6. The drill pipe assembly of claim 5, wherein the second end of the tubular pipe link comprises external threads and the coupling end of the second drill pipe comprises internal threads to be threadedly attached the tubular pipe link.

7. The drill pipe assembly of claim 1, wherein the tubular pipe link is part of a drill string and wherein the threaded connection between the tubular pipe link and the first drill pipe is the weakest point of the drill string.

8. The drill pipe assembly of claim 7, wherein the threads of the first end of the tubular pipe link are configured to collapse under torque that is 15% less than a required torque to break a next weakest link or portion of the drill string.

9. The drill pipe assembly of claim 1, wherein the first end of the tubular pipe link comprises between 12% and 18% less threads than the threaded end of the first drill pipe.

10. The drill pipe assembly of claim 1, wherein the first end of the tubular pipe link comprises about 15% less threads than the threaded end of the first drill pipe.

11. The drill pipe assembly of claim 10, wherein the first end of the tubular pipe link comprises 12 threads and the threaded end of the first drill pipe comprises 14 threads.

12. A wellbore tool assembly comprising:
    a drill pipe configured to be disposed in a wellbore;
    a bottom hole assembly (BHA) coupled to the drill pipe; and
    a tubular pipe link fluidically coupled to the drill pipe, the tubular pipe link residing between a first portion of the drill pipe and a second portion of the drill pipe to fluidically couple the first portion of the drill pipe to the second portion of the drill pipe, the tubular pipe link comprising a first end and a second end opposite the first end, the first end threadedly coupled to a threaded end of the first portion of the drill pipe to form a threaded connection and the second end attached to the second portion of the drill pipe, the first end of the tubular pipe link comprising less threads than the threaded end of the first portion of the drill pipe, wherein at least some of the threads of the first end of the tubular pipe link are collapsible to disconnect the first portion of the drill pipe from the second portion of the drill pipe responsive to torque to tighten the first portion of the drill pipe to the tubular pipe link.

13. The wellbore tool assembly of claim 12, wherein the BHA resides downhole of the drill pipe with the tubular pipe link residing uphole of the BHA.

14. The wellbore tool assembly of claim 12, wherein the BHA is disposed uphole of the tubular pipe link and resides between a third portion of the drill pipe and the second portion of the drill pipe, and wherein the tubular pipe link resides between the second portion of the drill pipe and the first portion of the drill pipe.

15. The wellbore tool assembly of claim 12, further comprising a second tubular pipe link similar to the tubular pipe link, the second tubular pipe link fluidically coupled to the drill pipe, and wherein the tubular pipe link resides uphole of the BHA and wherein the second tubular pipe link resides downhole of the BHA.

16. The wellbore tool assembly of claim 12, wherein the threaded end of the first drill pipe comprises external threads and the first end of the tubular pipe link comprises internal threads.

17. The wellbore tool assembly of claim 12, wherein the first end of the tubular pipe link comprising between 12% and 18% less threads than the threaded end of the first drill pipe.

18. A drill pipe disconnect link comprising:
a tubular body configured to be disposed in a wellbore, the tubular body defining a first end and a second end opposite the first end, the first end configured to be threadedly coupled to a threaded end of a first drill pipe and the second end configured to be attached to a second drill pipe to fluidically couple the first drill pipe to the second drill pipe, the first end comprising less threads than the threaded end of the first drill pipe, wherein at least some of the threads of the first end are collapsible to disconnect the first drill pipe from the second drill pipe responsive to torque to tighten the first drill pipe to the tubular body with the second drill pipe disposed downhole of the first drill pipe and stuck in the wellbore.

19. The drill pipe disconnect link of claim 18, wherein the threaded end of the first drill pipe comprises external threads and the first end of the tubular body comprises internal threads.

20. The drill pipe disconnect link of claim 18, wherein the drill pipe disconnect link is part of a drill string and wherein a threaded connection between the drill pipe disconnect link and the first drill pipe is a weakest point of the drill string.

\* \* \* \* \*